United States Patent
Flegel et al.

(10) Patent No.: US 8,810,081 B1
(45) Date of Patent: Aug. 19, 2014

(54) INTERLOCK ARRANGEMENT FOR CONTROLLING THE NEUTRAL OUTPUT OF A PORTABLE GENERATOR

(75) Inventors: Michael O. Flegel, Racine, WI (US); Jeffrey D. Flegel, Racine, WI (US)

(73) Assignee: Reliance Controls Corporation, Racine, WI (US)

( * ) Notice: Subject to any disclaimer, the term of this patent is extended or adjusted under 35 U.S.C. 154(b) by 688 days.

(21) Appl. No.: 13/038,881

(22) Filed: Mar. 2, 2011

Related U.S. Application Data (60) Provisional application No. 61/393,117, filed on Oct. 14, 2010, provisional application No. 61/309,624, filed on Mar. 2, 2010.

(51) Int. Cl.
*H02B 1/16* (2006.01)

(52) U.S. Cl.
USPC .............................. 307/328; 307/30

(58) Field of Classification Search
CPC .......................................... H02B 1/16
USPC .................................... 307/30, 328
See application file for complete search history.

(56) References Cited

U.S. PATENT DOCUMENTS

| | | | |
|---|---|---|---|
| 3,694,790 A | 9/1972 | Martin | |
| 4,477,143 A | 10/1984 | Taylor | |
| 5,322,449 A | 6/1994 | Pizano | |
| 5,722,847 A | 3/1998 | Haag | |
| 5,902,150 A | 5/1999 | Sigl et al. | |
| 6,166,525 A * | 12/2000 | Crook | 322/11 |
| 6,193,548 B1 | 2/2001 | Sigl et al. | |
| 6,350,139 B1 | 2/2002 | Haag | |
| 6,358,076 B1 | 3/2002 | Haag | |
| 6,424,060 B1 | 7/2002 | Shiely et al. | |
| 6,504,268 B1 * | 1/2003 | Flegel | 307/85 |
| 6,525,541 B1 | 2/2003 | Leopold | |
| 6,788,504 B2 * | 9/2004 | Vanderkolk | 361/42 |
| 6,796,814 B1 | 9/2004 | Handschke | |
| 6,979,787 B2 | 12/2005 | Davies | |
| 7,569,785 B2 | 8/2009 | Mills et al. | |
| 7,575,467 B2 | 8/2009 | Ferguson et al. | |
| 7,604,246 B2 * | 10/2009 | Sodemann et al. | 280/47.315 |
| 2002/0180451 A1 | 12/2002 | Leopold et al. | |
| 2005/0122650 A1 | 6/2005 | Beasley, III et al. | |
| 2006/0146581 A1 | 7/2006 | Murphy | |
| 2006/0270280 A1 * | 11/2006 | Sodemann et al. | 439/638 |
| 2008/0079264 A1 * | 4/2008 | Serdynski et al. | 290/30 A |
| 2008/0265844 A1 * | 10/2008 | Smith et al. | 322/1 |
| 2011/0095540 A1 * | 4/2011 | Jackson et al. | 290/1 A |

FOREIGN PATENT DOCUMENTS

JP 2010277718 A * 12/2010

* cited by examiner

*Primary Examiner* — Adi Amrany
(74) *Attorney, Agent, or Firm* — Boyle Fredrickson, S.C.

(57) ABSTRACT

An interlock arrangement allows a floating neutral electrical generator having a receptacle, such as a duplex receptacle, absent GFCI protection to be used to provide electrical power to the electrical system of a home or other building during utility power interruption. The interlock arrangement includes structure to disable or prevent access to the duplex receptacle when the electrical generator is coupled to the power cord used to transfer electrical power from the generator to the electrical system of the building. Thus, the duplex receptacles cannot be used to power electrical devices when the generator is connected to supply power to the electrical system of the building. Conversely, when the generator is physically disconnected from the electrical system of the building, the interlock arrangement exposes or supplies power to the duplex receptacles, and may be configured to close access to the receptacle used for connecting to a building electrical system.

15 Claims, 6 Drawing Sheets

INTERLOCK ARRANGEMENT FOR CONTROLLING THE NEUTRAL OUTPUT OF A PORTABLE GENERATOR

CROSS-REFERENCE TO RELATED APPLICATION

This application claims the benefit of U.S. Ser. No. 61/393,117 filed Oct. 14, 2010 and U.S. Ser. No. 61/309,624 filed Mar. 2, 2010, the disclosures of which are incorporated herein in their entirety.

BACKGROUND AND SUMMARY OF THE INVENTION

The present invention relates generally to electrical generators that can provide backup electrical power to an electrical system or that can be used as a stand-alone power supply for powered accessories, such as power tools. More particularly, the present invention is directed to an apparatus for selectively disabling outputs of an electrical generator based on the type of load placed on the electrical generator.

In today's electrical supply systems, there are occasions when alternate sources of electrical power are necessary or desirable. For example, the capability of switching from utility power to emergency generator power is extremely important for many businesses, hospitals and industries, as well as residential dwellings. Engine driven electrical generators are commonly used to provide backup or emergency electrical power in those instances when utility power is interrupted. Additionally, portable electrical generators allow electrical power to be provided at locations where utility power is not available.

Electrical generators can generally be categorized as bonded neutral generators or floating neutral generators. With a bonded neutral electrical generator, the neutral conductor and the safety ground conductor of the electrical generator are internally tied or "bonded" together. For floating neutral generators, on the other hand, the neutral conductor and the safety ground conductor are not tied together. Bonded neutral generators are most commonly used on construction sites and are popular among the professional trades. Floating neutral generators are typically used by homeowners either to provide backup power to electrical loads through the wiring system of the home or building or to power cord connected devices.

Portable electrical generators will typically have a dedicated receptacle or socket that is designed for larger loads and to engage with a power cord that is electrically coupled either to the electrical system of the building, typically through a transfer switch and panel, or to some other distribution system such as a distribution box for a number of cord connected devices. For most portable electrical generators, a multipole locking receptacle is used to engage and lock the male end of the power cord to prevent accidental disconnection of the power cord from the electrical generator. Via the interconnection of the male end of the power cord with the multipole locking receptacle or socket, the live conductors of the electrical generator will be electrically connected to appropriate poles of the transfer switch and panel. When connecting a floating neutral generator to a building's wiring system as a non separately derived system, the neutral conductor will be electrically connected to the neutral bus of the service entrance or main panel generally through the transfer panel and the ground conductor will be connected to the ground bus of the service entrance or main panel also generally via the transfer panel. Thus, the electrical generator is "grounded" via electrical connection with the ground bus of the service entrance or main panel.

In a non-separately derived arrangement such as that described above, when a bonded neutral electrical generator is supplying electrical power to one or more loads of the building through the building wiring system, electrical current will return via the neutral conductor of the load to the neutral bus conductor of the main electrical panel. A first portion of electrical current then flows from the neutral bus conductor of the building back to the neutral conductor of the generator, thus completing a circuit path. A remaining portion of electrical current flows from the neutral bus conductor of the building to a neutral-to-ground tie bar at the electrical panel, through the grounding bus conductor, back through the safety ground-to-neutral bonding conductor of the generator, and then through the neutral conductor of the generator, completing another circuit path. As provided in the United States National Electrical Code, Article 250, a power system should be electrically grounded in such a manner that prevents a flow of electrical current via the neutral conductor of the building back to the safety grounding conductor of the generator, in all situations except for an electrical power fault (q.v., Article 250 of the National Electrical Code). The safety grounding conductor is expected to be pristine or absent of the normal flow of electrical current, and instead is to be used to conduct electrical current safely to ground only when there is an electrical fault occurrence. Thus, the use of bonded neutral generators to supply backup electrical power to the electrical system of a home or other building requires a system that switches the neutral, know as a separately derived system. This system is more costly to buy and install.

Portable electric generators will typically have one or more duplex receptacles in addition to the multipole locking receptacle for receiving the male end of an extension cord or the power cord of an electrical device. As known in the art, the duplex receptacles allow electrical devices to be powered directly by the electrical generator rather than through a building wiring system. In most instances, the duplex receptacles are designed to receive a three-prong plug of a power cord. In this regard, each socket of the duplex receptacle is designed to receive a hot conductor, neutral conductor, and ground conductor of a conventional male end of a three-prong plug. As is known, each socket of the duplex receptacle is also capable of receiving a non-grounded plug of a power cord.

Floating neutral electrical generators are typically not grounded, i.e., not only is the neutral not connected to the safety ground but the safety ground is also not connected to earth because the generator frame is not conductively connected to earth such as through a grounding rod. As a result, when the generator is used as a stand-alone power supply or providing electrical power directly to one or more electrical devices without an electrical connection to the electrical wiring system of the building, ground fault protection is unnecessary because a path for current to flow back to the generator does not exist through the ground. In other words, ground fault protection is built into the system through isolation of the neutral wire from the ground thereby eliminating the need for duplex receptacles incorporating ground fault circuit interrupter (GFCI) devices. However, when a floating neutral generator is connected to the electrical system of a building, the generator becomes grounded through its electrical connection to the electrical system of the building. As a result, there can be a ground fault risk when a floating neutral generator is connected to the electrical system of a building. One way to reduce this risk on floating neutral generators is to equip them with duplex receptacles that include GFCI devices, which can be costly and are only needed when the generator is connected to a building.

Increasingly, the professionals and homeowners have demanded a single generator capable of being used for both construction and for backup power supply for the electrical system of a home, apartment, or other building when utility power is interrupted. They all would prefer to install the generator in a non separately derived system as this is the most common and economical installation. For a floating neutral generator to accomplish this task, costly GFCI protected duplex receptacles should be used for ground fault protection when the generator is connected to the electrical system of the home or building. Since bonded neutral generators internally bond the neutral and ground conductors, costly GFCI devices are also used to provide ground fault protection primarily in construction applications where they are now required by the NEC. Moreover, it has been found that connecting a bonded neutral generator to the electrical system of a home or building as a non separately derived system can result in "false" triggering of ground faults. That is, the flow of electrical current to the safety grounding conductor of the generator has been known to trigger a ground fault circuit interrupter at the generator. When triggered, the ground fault circuit interrupter will de-energize the live conductors of the generator and prevent the supply of electrical power to the circuits connected to the transfer equipment. To avoid this nuisance tripping of the GFCI, the consumer must un-tie the bonding of the generator neutral and the generator ground. Many consumers are hesitant to tackle such a task and, moreover, it requires the consumer to remember to retie the generator neutral and the generator ground when the electrical generator is used to power electrical equipment directly rather than through the wiring of the home or building.

The present invention provides an interlock arrangement that allows a floating neutral electrical generator having a receptacle, such as a duplex receptacle, absent GFCI protection to be safely used to provide electrical power to the electrical system of a home or other building during utility power interruption. More particularly, the interlock arrangement includes structure to prevent access to the duplex receptacle when the electrical generator is coupled to the power cord used to transfer electrical power from the generator to the electrical system of the home. Thus, the duplex receptacles cannot be used to power tools or other electrical devices when the generator is connected to supply power to the electrical system of the home or building. However, when the generator is physically disconnected from the electrical system of the home or building, the interlock arrangement exposes the duplex receptacles thereby enabling their use.

The invention also provides structure to switch an electrical generator between a bonded neutral arrangement and a floating neutral arrangement. Moreover, the structure prevents the simultaneous availability of electrical power at both the multipole locking (or similar) receptacle used to connect the electrical generator to the electrical system of the home or building and the duplex receptacle(s). In this regard, the invention provides structure that unties the generator neutral and generator ground when the electrical generator is being used to supply backup or emergency electrical power to a home or building through its electrical system and ties the generator neutral and the generator ground when the electrical generator is disconnected from the electrical system of the home or building.

It is therefore an object of the invention to provide an interlock arrangement for use with an electrical generator that expands the usability of the electrical generator without requiring user modification of the internal wiring of the electrical generator.

It is another object of the invention to provide an interlock arrangement that prevents use of duplex receptacles of the generator when the generator is connected to provide emergency or backup power to a home or building.

It is a further object of the invention to provide an electrical generator switchably usable as a floating neutral generator or a bonded neutral generator.

Various other features, objects and advantages of the present invention will be made apparent from the following detailed description of the drawing figures.

BRIEF DESCRIPTION OF THE DRAWINGS

The drawings illustrate one preferred embodiment presently contemplated for carrying out the present invention.

In the drawings.

DETAILED DESCRIPTION

Figure 1:
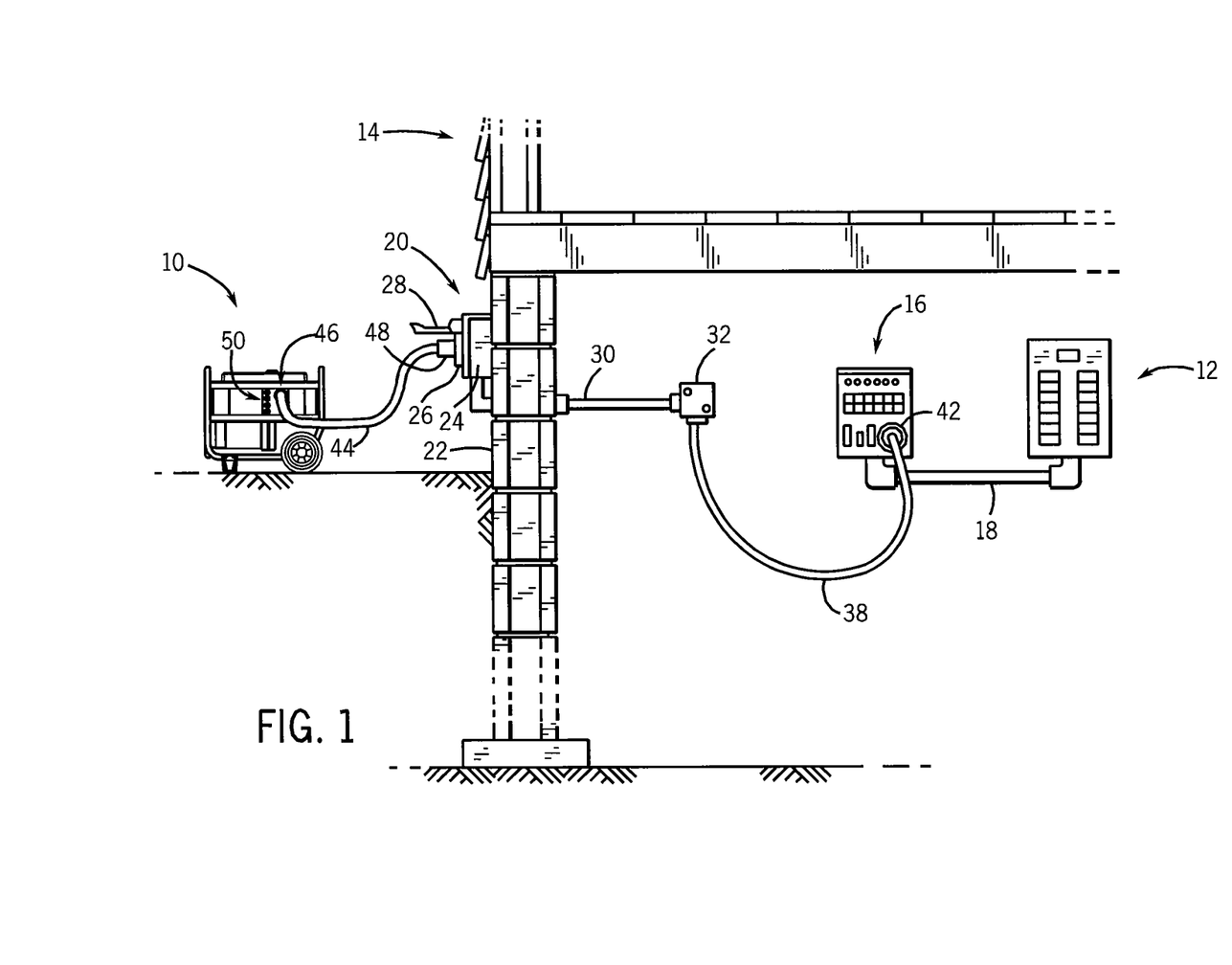
FIG. 1 is a schematic representation showing a power management system for switchably providing electrical power from a utility and an auxiliary power supply, such as a portable electrical generator, to a load center or electrical panel associated with a building.

FIG. 1 shows a power inlet arrangement for interconnecting a portable generator 10 with a main electrical panel or load center 12 located in the interior of a building 14. In the power inlet arrangement of FIG. 1, a power transfer panel 16 is mounted adjacent main panel 12, and is interconnected therewith via a series of wires enclosed by a conduit 18 extending between main panel 12 and transfer panel 16. Transfer panel 16 may illustratively be a panel such as that manufactured by Reliance Controls Corporation of Racine, Wis.

A power inlet box 20 is mounted to the wall of building 14, shown at 22. Power inlet box 20 includes an external housing including a series of walls such as 24, and a receptacle 26 mounted to a front wall of the housing. A cover 28 is mounted to the front wall of the housing via a hinge structure, and is movable between an open position as shown in FIG. 1 and a closed position in which cover 28 encloses receptacle 26 when not in use. A conduit 30 extends between inlet box 20 and a junction box 32, and a flexible cord 38 is attached at one end to junction box 32. At its opposite end, flexible cord 38 has a connector 42 engageable with a power inlet receptacle provided on transfer panel 16. Appropriate wiring and connections are contained within inlet box 20, conduit 30 and junction box 32 for providing an electrical path between inlet box 20 and transfer panel 16 when cord 38 is engaged with the inlet receptacle of transfer panel 16.

A power cord 44 extends between generator 10 and power inlet box 20. Cord 44 includes a plug 46 at one end, which is engageable with the power outlet of generator 10. As will be described more fully below, the electrical generator 10 has a multipole locking receptacle (not shown) with which the plug 46 is engaged and locked, in order to electrically connect the generator 10 to the power inlet box 20. Cord 44 further includes a connector 48 at the end opposite plug 46. Connector 48 is engageable with receptacle 26 for transferring power generated by generator 10 to power inlet box 20, which is then supplied through the wiring in conduit 30, junction box 32, cord 38 and connector 42 to transfer panel 16, and from transfer panel 16 through the wiring in conduit 18 to main panel 12. In this manner, generator 10 functions to provide power to selected circuits of main panel 12 during a power outage. In this arrangement, the user first connects cord 38 to the power input of transfer panel 16 utilizing connector 42, and then exits the building, connects cord 44 between generator 10 and power inlet 20, and then commences operation of generator 10. In addition to the aforementioned multipole locking receptacle 46, the electrical generator 10 also includes duplex receptacles 50 that allow the electrical generator 10 to provide electrical power to one or more power accessories when such accessories are plugged into the duplex receptacles 50. As will be described, the electrical generator 10 includes structure that prevents simultaneous use of the multipole locking receptacle 46 and the duplex receptacles 50.

Figure 2:
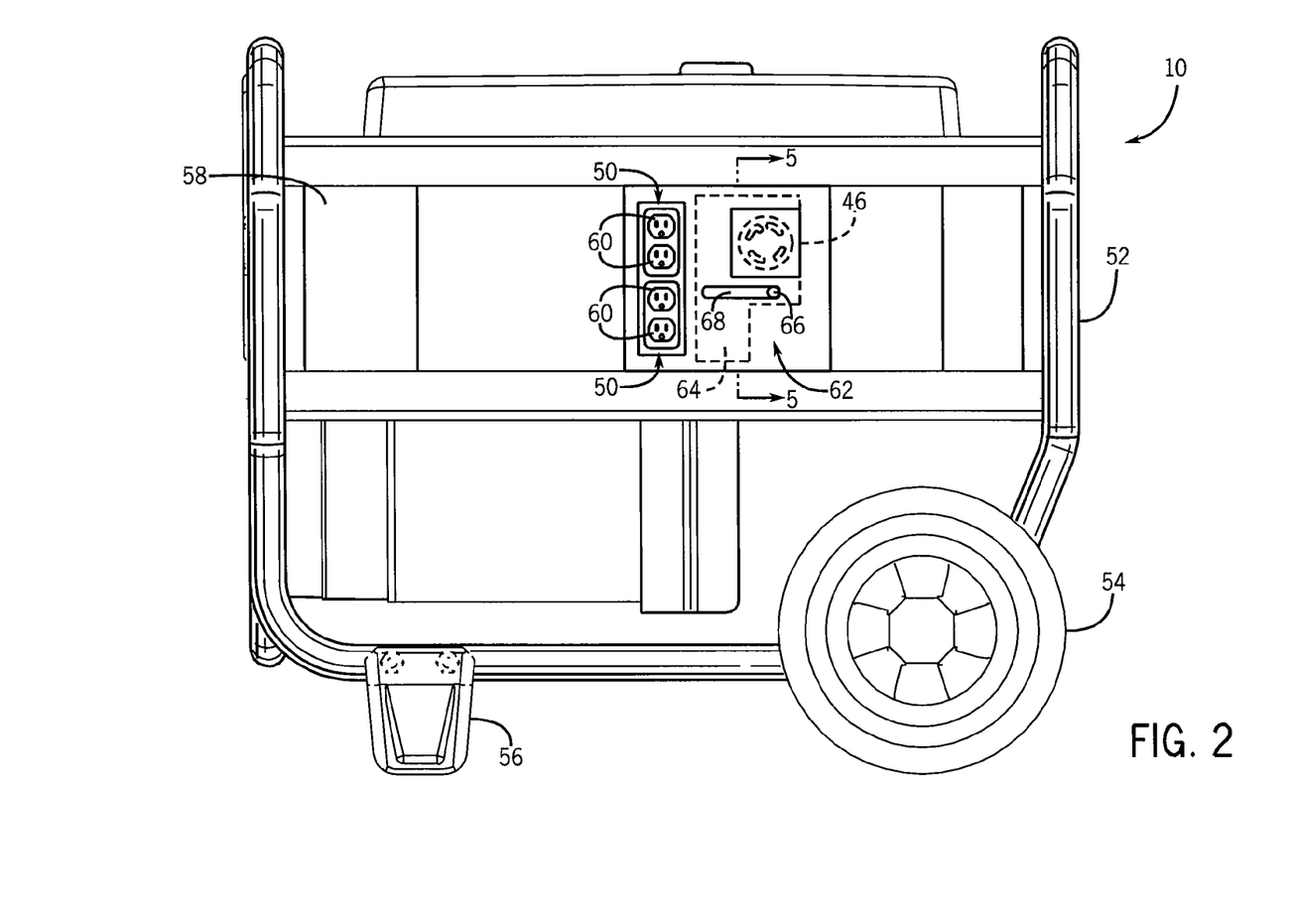
FIG. 2 is a side elevation view of the electrical generator for use with the power management system of FIG. 1 according to one aspect of the invention.

Turning now to FIG. 2, the electrical generator 10 is designed to be a portable power supply and thus has a frame 52 supported by a wheels 54. Forward of the wheels 54 are feet 56 that are mounted to a lower portion of the frame 52 and provide stability for the electrical generator 10 when placed in position. As known in the art, the electrical generator 10 has an internal combustion engine (not shown) enclosed within a housing structure 58 that is carried by the frame 52 in a conventional manner. The internal combustion engine creates mechanical energy that is converted in a known manner to electrical energy that is made available at multipole locking receptacle 46 and duplex receptacle 50. In contrast to conventional electrical generators, the present invention provides an electrical generator 10 having structure that prevents simultaneous use of the multipole locking receptacle 46 and the duplex receptacles 50. In this regard, when the multipole locking receptacle 46 is being used to feed electrical current to power cord 44, electrical accessories or devices cannot be powered through the duplex receptacles 50. Similarly, when electrical accessories or devices are plugged into the duplex receptacles 50, electrical power cannot be provided to the power cord 44.

In one embodiment of the invention, the electrical generator 10 has a pair of duplex receptacles 50; however, the invention is not so limited and may have any number of duplex receptacles. In addition, it is understood that the generator 10 may have receptacles other than duplex receptacles, although it is understood that duplex receptacles are most commonly employed. Each duplex receptacle 50 may include a pair of outlets or sockets 60 that are stacked vertically. The sockets 60 could also be oriented horizontally. The sockets 60 are mounted to the housing 58 in a conventional manner and are located generally adjacent the multipole locking receptacle 46. As known in the art, each socket 60 typically has a live conductor, a neutral conductor, and a ground conductor. In one embodiment, the neutral conductors for each of the sockets 60 are not connected to the generator frame 52. The generator frame 52 itself is typically not grounded (connected to Earth) so, in accordance with the invention, the duplex receptacles 50 do not have GFCI devices. That is, when the generator is used without an electrical connection to the building wiring system, GFCI protection is not needed because a path for current to flow back to the generator does not exist through the ground. Essentially, ground fault protection is built into the system through isolation of the neutral wire from the ground, thus eliminating the need for a GFCI device. The multipole locking receptacle 46, on the other hand, is only used when providing electrical power to the building wiring system and is afforded ground fault protection via that connection. However, when the generator 10 is electrically connected to the building wiring system, the generator neutral becomes connected to the ground. Conventional electrical generators can avoid ground faults in such an instance by relying upon a GFCI device, which is relatively costly. As will be described more fully below, the present invention avoids the need for such a GFCI device by locking out use of the duplex receptacles 50 when the electrical generator 46 is coupled to power cord 44.

The present invention provides a lockout arrangement that disables or locks out operation of the non-GFCI duplex receptacles 50 when the generator 10 is coupled to the wiring system of a building (and therefore is grounded). In other words, when the power supply 44 that is interconnected with the building wiring system is engaged with the multipole locking receptacle 46, the lockout arrangement disables or locks out operation of the outlets 60 and thus prevents an electrical device from being powered by the generator using the duplex receptacles 50. Thus, the non-grounded receptacles 50 cannot be used when the multipole locking receptacle 46 is connected to power cord 44. On the other hand, when the electrical generator 10 is not connected to power cord 44, the outlets 50 are available for use.

The disabling or lockout arrangement of the present invention may take many forms, a few of which will be described herein. It should be understood, however, that the embodiments described herein are merely exemplary and are not intended to limit the invention as defined by the appending claims in any way.

Figure 3:
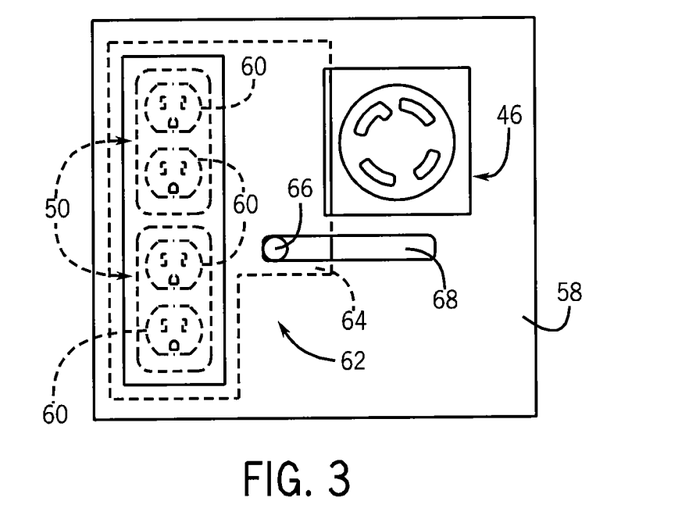
FIG. 3 is a partial enlarged elevation view of the electrical generator showing an interlock arrangement preventing access to a duplex receptacle according to one embodiment of the invention.
Figure 4:
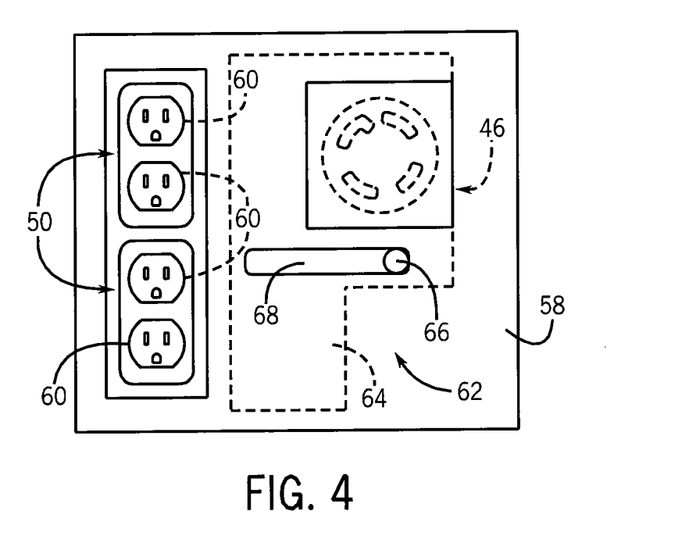
FIG. 4 is an enlarged elevation view of the electrical generator similar to FIG. 3, showing the interlock arrangement preventing access to a multipole locking receptacle according to one embodiment of the invention.
Figure 5:
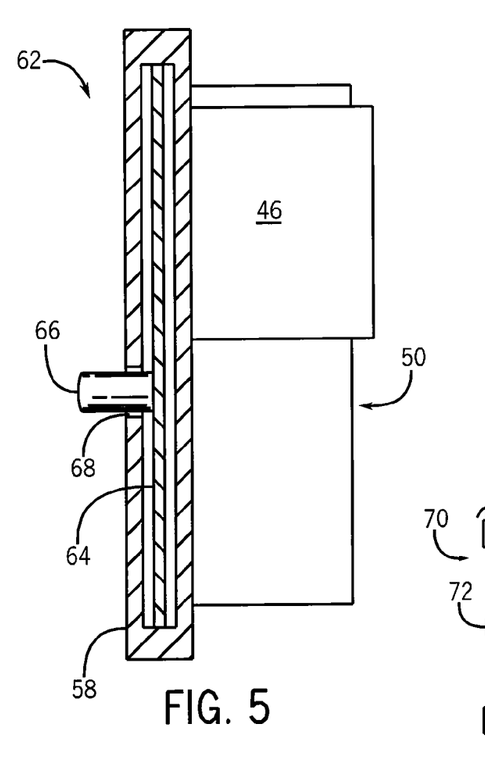
FIG. 5 is a section view of the electrical generator taken along line 5-5 of FIG. 2.

With reference now to FIGS. 2-5, in one embodiment, a lockout arrangement 62 includes a lockout member in the form of a plate 64 that is movably mounted to the generator 10. In the illustrated embodiment, the lockout plate 64 is slidable between two positions, although it is understood that any other satisfactory type of movement may be employed. In the first position, the plate 64 is positioned over the duplex receptacles 50, but exposes the multipole locking receptacle 46, as shown in FIG. 3. In the second position, the plate 64 is positioned over the multipole locking receptacle 46, but exposes the duplex receptacles 50, as shown in FIGS. 2 and 4. The lockout plate 64 is configured such that only one of the multipole locking receptacle 46 and the duplex receptacles 50 can be exposed at a time. As a result, to expose the multipole locking receptacle 46, the lockout plate 64 must be manually moved to the first position, which results in the lockout plate 64 covering the duplex receptacles 50 so that the duplex receptacles 50 cannot be accessed. Similarly, to expose the duplex receptacles 50, the lockout plate 64 must be manually moved to the second position, which results in the lockout plate 64 covering the multipole locking receptacle 46 so that the multipole locking receptacle 46 cannot be accessed. Accordingly, it is not possible for both the multipole locking receptacle 46 and the duplex receptacles 50 to be exposed and used at the same time.

In accordance with this embodiment, the lockout arrangement 62 includes a pin 66 that extends outwardly from the face of the generator housing 58. The lockout plate 64 includes a slot or channel 68, and the pin 66 extends through the channel 68 in a manner that allows the plate 64 to slide along the pin 66 between the first and second positions by engagement of the pin 66 with the ends of the channel 68. It is understood, of course, that pin 66 and channel 68 are representative of any number of satisfactory movable engagement arrangements that may be interposed between generator housing 58 and lockout plate 64 for providing movement of lockout plate 64 between the first and second positions.

In the illustrated embodiment, the duplex receptacles 50 and the multipole locking receptacle 46 are positioned side-by-side and thus the lockout arrangement 62 is oriented so that that the lockout plate 64 slides side-to-side. It is also contemplated that the duplex receptacles and the multipole locking receptacle can also be in a stacked (up-down) or angularly offset configuration. In a stacked configuration, the lockout arrangement 62 would be oriented so that the channel 68 is oriented vertically, i.e., perpendicular to the orientation shown in FIGS. 3-4. This orientation would allow the lockout plate 64 to slide vertically to selectively expose the multipole locking receptacle 46 and the duplex receptacles 50. In an angularly offset configuration, the lockout arrangement 62 would slide at an angle to selectively expose the multipole locking receptacle 46 and the duplex receptacles 50.

While lockout arrangement 62 is shown and described as an external assembly that is configured to overlie the openings of multipole locking receptacle 46 and duplex receptacles 50, it is also understood that an internal lockout arrangement is contemplated as being within the scope of the present invention. In such an arrangement, for example, it is contemplated that the openings of the multipole locking receptacle 46 and the duplex receptacles 50 may be exposed but that the lockout member would prevent the plug prongs from being inserted into the receptacle openings.

It will be appreciated that the lockout arrangement 62 mechanically closes off access to one of the duplex receptacles 50 or the multipole locking receptacle 46. In this regard, electrical power is simultaneously available at both receptacles but only one of the receptacles can be accessed.

Figure 6:
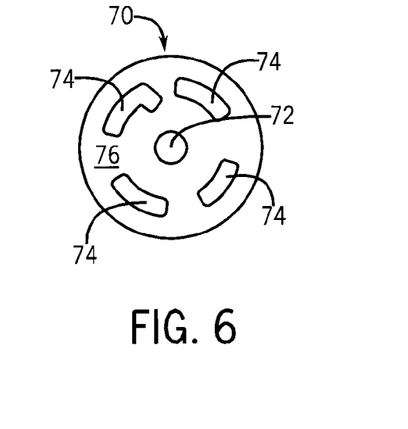
FIG. 6 is a front elevation view of a multipole locking receptacle according to another embodiment of the invention.
Figure 7:
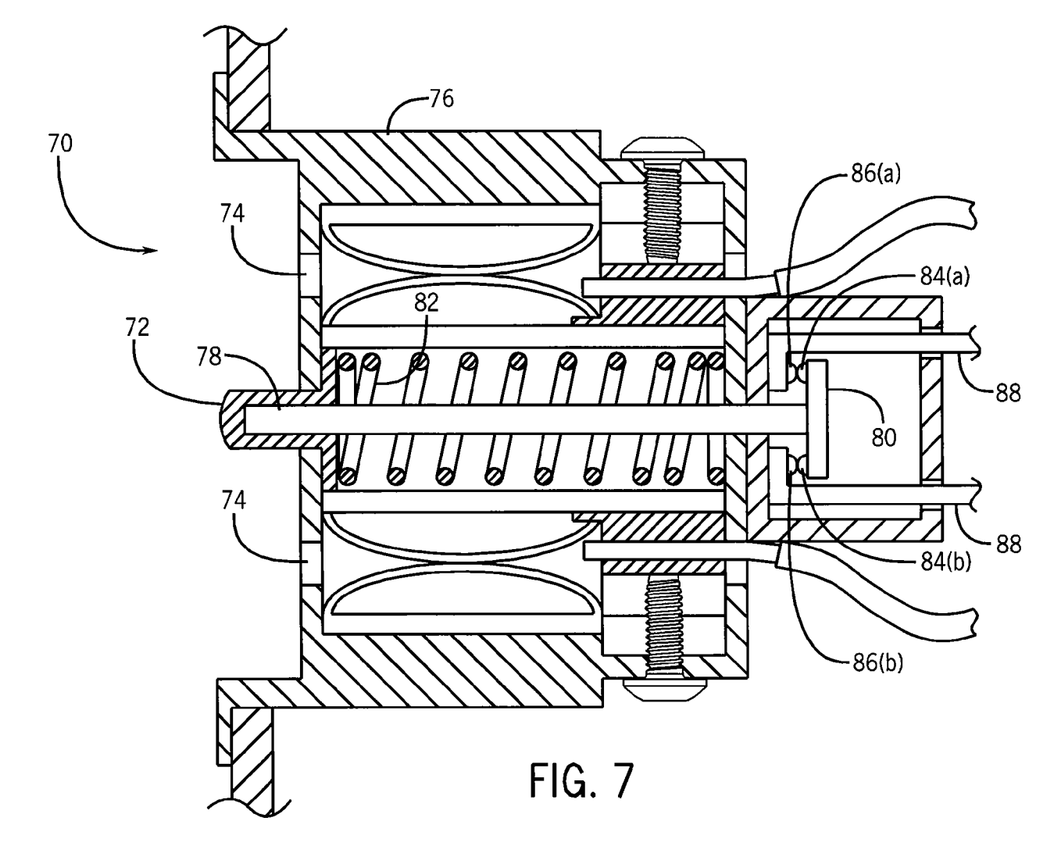
FIG. 7 is a section view of the multipole locking receptacle taken along line 7-7 of FIG. 6.
Figure 8:
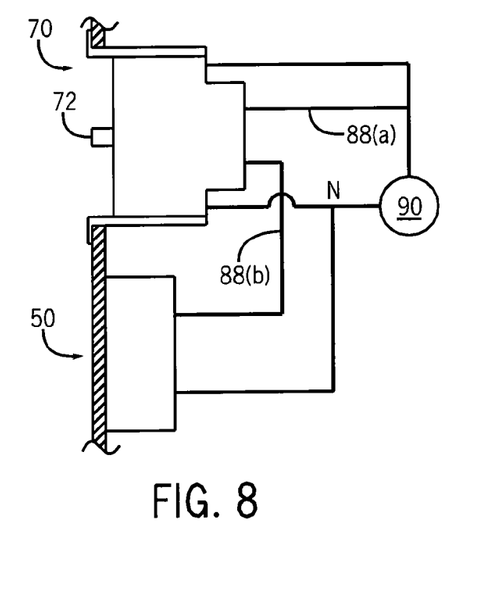
FIG. 8 is a schematic diagram of a power distribution arrangement for the electrical generator using the twist-lock receptacle of FIGS. 6-7 according to an embodiment of the invention.

Referring now to FIGS. 6-8, in accordance with another embodiment of the invention, the lockout arrangement is in the form of a multipole locking receptacle 70 usable with the electrical generator 10 and having a pushbutton 72 that is generally centered between the slotted openings 74 formed in the front face 76 of the receptacle 14. As shown at FIG. 8, the pushbutton 20 is biased toward an outward or extended position. In the default position, the lockout arrangement allows electrical power to be available at the outlets 60 of the duplex receptacles 50. On the other hand, when the pushbutton 72 is depressed (pushed inward), such as due to engagement by the plug 46 of the power cord 40, electrical power is unavailable at the outlets 60 so that even if a power plug of an accessory (not shown) is plugged into one of the outlets 60, the accessory will not be powered. The pushbutton 72 is automatically pushed inward when the power cord 44 is plugged into the receptacle 70. Thus, the outlets 60 are automatically disabled and a user is not required to separately engage the pushbutton 72.

With particular reference to FIG. 7, the pushbutton 72 is generally comprised of a post 78 and an armature 80 coupled to a distal end of the post 78 and that is biased in the extended position by a spring 82. The armature 80 is made of electrically conductive material and includes a pair of contacts 84(*a*), 84(*b*) that selectively engage stationary contacts 86(*a*), 86(*b*), respectively, when the pushbutton 72 is in the extended position. In this regard, when the spring 82 biases the post 78, and thus the pushbutton 72, to the extended position, the armature 80 is drawn outwardly so that its contacts 84 are in engagement with contacts 86. In this position, the armature 80 and the contacts 84, 86 effectively close the circuit path between the contacts 86(*a*) and 86(*b*). As schematically shown in FIG. 8, contacts 86(*a*) and 86(*b*) are coupled to respective portions of the "hot" wire 88 that carries electrical current to the duplex receptacles 50, of which only one is shown for illustration purposes. More particularly, contact 86(*a*) through wire portion 88(*a*) is connected to the current generator 90 of the generator 10 whereas contact 86(*b*) through wire portion 88(*b*) is connected to the duplex receptacle(s) 50. When contacts 84, 86 are engaged, electrical current is permitted to flow from the current generator 90 to the duplex receptacle(s) 50.

On the other hand, when power plug 44 is plugged into the multipole locking receptacle 70, the pin 72 is depressed which causes the post 78 to overcome the bias of the spring 82 and move inwardly (left-to-right in FIG. 7). This movement of post 78 causes the armature 80 to move away from contacts 86, and thus form a gap between contacts 84 and 86. This movement of post 78 thus creates an open circuit condition in wire 88 and prevents the flow of electrical current to the duplex receptacle(s) 50. In this manner, power is not supplied to duplex receptacles 50 when power plug 44 is plugged into multipole locking receptacle 70.

When the power plug 44 is unplugged from the multipole locking receptacle 70, the force tending to maintain pin 72 in the depressed position is removed, and the bias of the spring 82 forces the post 78 and thus pin 72 outwardly (right-to-left in FIG. 7). This movement of post 78 causes the armature 80 to follow such movement, and results in engagement of contacts 84 against contacts 86. This movement effectively resets the lockout arrangement, whereupon electrical current is free to flow to the duplex receptacle(s) 50. Thus, when the multipole locking receptacle 70 is not in use, power can be available at the duplex receptacles 50.

It will thus be appreciated that the pushbutton 72, post 78, and armature 80 effectively form a switch that is switchable between an ON position when multipole locking receptacle 70 is not in use, and an OFF position when multipole locking receptacle 70 is in use. In the ON position, contacts 84 and 86 are held against each other to allow electrical current flow through wire 88 to duplex receptacle(s) 50. In the OFF position, the contacts 84 and 86 are spaced from each other to create an open circuit in wire 88 that prevents the flow of electrical current to duplex receptacle(s) 50. It will be appreciated that other types of switching arrangements may be used and are considered within the scope of the invention. For example, a proximity sensor could be used to sense insertion of a power plug into the multipole locking receptacle 46 and the sensor could provide control signals to a switch (not shown) to create an open circuit in wire 88.

Figure 9:
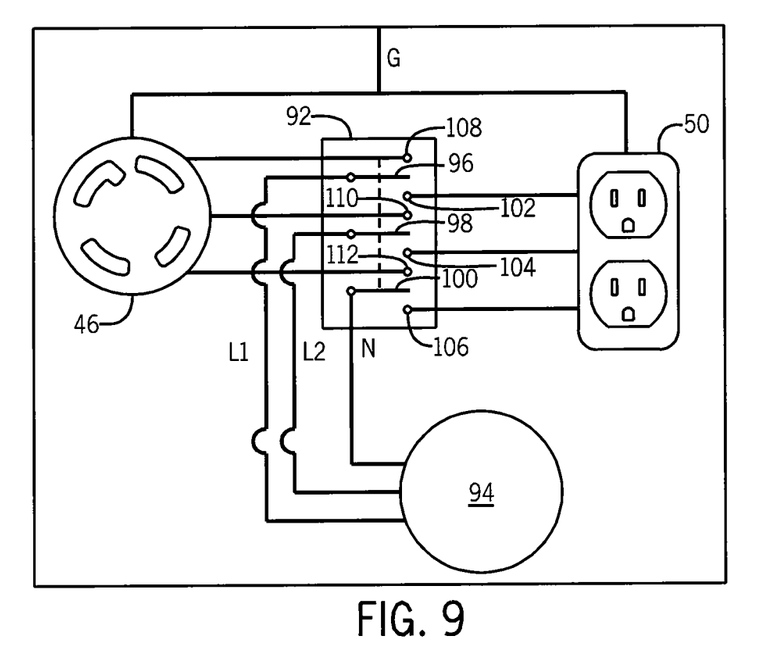
FIG. 9 is a schematic diagram of a switch arrangement to selectively energize outputs of the electrical generator according to another embodiment of the invention.

Turning now to FIG. 9, in another embodiment, the lockout arrangement includes a three-pole switch 92 mounted to the generator 10 that is used to selectively switch the duplex receptacle(s) 50 and the multipole locking receptacle 46 to the electrical output of the generator 10, schematically shown at 94. The three-pole switch 92 has a generally conventional design, and thus includes movable "hot" contacts 96, 98, and a neutral contact 100 that interface with either stationary contacts 102, 104, and 106, respectively, for the duplex receptacle 50 or with stationary contacts 108, 110, and 112, respectively, of the multipole locking receptacle 46. In one embodiment, the movable contacts 96, 98, and 100 are mounted to a common bridge (not shown) so that the movable contacts switch in unison.

The three-pole switch 92 is switchable between two positions. In the first position, the movable contacts 96, 98, 100 are engaged with the contacts 102, 104, 106, respectively, of the duplex receptacle 50 so that electrical power from the generator output 94 is available at the duplex receptacle 50. In the second position, the movable contacts 96, 98, 100 are engaged with contacts 108, 110, 112, respectively, of the multipole locking receptacle 46 so that electrical power from the generator output 94 is available at the multipole locking receptacle 46. The three-pole switch 92 cannot be in both the first and second positions at the same time. Thus, regardless of whether power plugs are engaged with both the duplex receptacle 50 and the multipole locking receptacle 46, electrical power will only be available at one of the receptacles, as determined by the position of the three-pole switch 92.

As referenced above, the three-pole switch 92 includes a movable contact 100 for the neutral conductors (contacts) of the duplex receptacle 50 and the multipole locking receptacle 46. In this regard, the three-pole switch 92 switches the "neutrals". This is necessary when the building power cord is engaged with the multipole locking receptacle 46 but utility power is being used to power the loads in the building, and a user desires to use the generator 10 to power an accessory via the duplex receptacle 50 without disconnecting the building power cord from the generator 10. In such a situation, the generator neutral feeding the duplex receptacle 50 would not be grounded by the cord connected to both the multipole locking receptacle 46 and the building wiring system. When the neutral contact 100 is switched to engage contact 106 for the duplex receptacle 50, the connection between the neutral contact 100 and the multipole locking receptacle 46 would be lost, and the duplex receptacle 50 would be protected against ground fault without the need for a GFCI device. For such an embodiment, it is preferred that a throw or similar mechanism (not shown) be incorporated into the three-pole switch 92 such that switching the hot contacts 96, 98 to engage contacts 108, 110 for the multipole locking receptacle 46 would cause the neutral contact 100 to disengage from contact 106 for the duplex receptacle 50 and engage contact 112 for the multipole locking receptacle 46. Thus, anytime the three-pole switch 92 connects the generator output 94 to the multipole locking receptacle 46, the neutral contact 100 is engaged with corresponding neutral contact 112.

As described above, bonded-neutral generators may have duplex receptacles with GFCI protection, whereas floating neutral generators typically do not. GFCI protection may be needed to provide ground fault protection when the generator is electrically connected to the electrical system of a building. GFCI devices can be costly and thus add to the cost of the generator, which is ultimately passed onto the consumer. As described above, in one embodiment of the invention, a switching and lockout arrangement is provided that allows a bonded neutral generator without GFCI devices to be electrically connected to the electrical system of a building. The switching and lockout arrangement prevents access to and/or operation of the non-GFCI protected duplex receptacles of the generator when the generator is electrically connected to the electrical system of the building.

In another embodiment, the invention provides a switching and lockout arrangement that, in addition to selectively disabling one or the other of the receptacles, selectively switches the generator between a bonded neutral arrangement and a floating neutral arrangement. As will be made apparent from the following description, the present invention allows a user to selectively take advantage of the benefits of a bonded neutral generator and a floating neutral generator in a single generator machine. In one embodiment, the generator has duplex receptacles 50, which typically will be provided with GFCI protection. As will be described, however, the duplex receptacles are isolated from the generator output when the generator is electrically connected to the electrical system of a building via the multipole locking receptacle.

Figure 10:
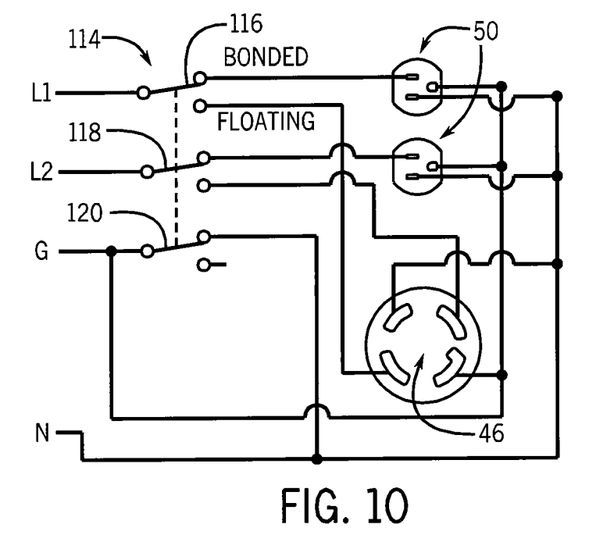
FIG. 10 is a schematic diagram of a switch arrangement for switching an electrical generator between a bonded-neutral configuration and a floating-neutral configuration.

Referring now to FIG. 10, the switching and lockout arrangement employs a three-pole switch 114 movable between a first position in which line conductors $L_1$, $L_2$ are connected to the corresponding input conductors of the duplex receptacles 50 and a second position in which the line conductors $L_1$, $L_2$ are connected to the corresponding input conductors of the multipole locking receptacle 46. The three-pole switch 114 also selectively switches the ground conductor G to be bonded or "tied" to the neutral conductor of the generator or electrically isolated ("floating") from the neutral conductor of the generator. When the three-pole switch 114 is in the first position, i.e. the bonded neutral position, which is illustrated in FIG. 10, the ground conductor is electrically connected to the neutral conductor. In this first position, the electrical output of the generator is therefore available at the duplex receptacles 50. On the other hand, when the three-pole switch 114 is in the second or floating position (not shown), the ground conductor is disconnected from the neutral conductor and thus "floating". Moreover, in this second position, the electrical output is available at the multipole locking receptacle 46. It will therefore be appreciated that the invention provides a generator that provides power at one or the other of the duplex receptacles 50 (in a bonded neutral configuration) or the multipole locking receptacle 46 (in a floating neutral configuration), and that is switchable between the bonded neutral configuration and the floating neutral configuration depending on the location of the power output, i.e. duplex receptacles 50 or multipole locking receptacle 46.

The three-pole switch 114 can be of known design, and thus includes movable contacts 116, 118, and 120 corresponding to line conductor $L_1$, line conductor $L_2$, and ground conductor G, respectively. The contacts 116, 118, and 120 are preferably carried by a shared or interlinked contact bridge (not shown), so that the contacts 116, 118, and 120 move in unison when the switch 114 is moved between positions. In this regard, when the three-pole switch 114 is in the first position so that electrical power is available at the duplex receptacles 50, the ground conductor is automatically tied to the neutral conductor. On the other hand, when the three-pole switch 114 is in the second position, electrical power is only available at the multipole locking receptacle 46 and the ground conductor is not tied to the neutral conductor, i.e., "floating".

It is understood that the switching and lockout arrangements described above can incorporate one or more of the lockout devices and features described herein to mechanically prevent physical access to the duplex receptacles and the multipole locking receptacle. In one embodiment, the lockout and the three-pole switch 114 may be interlinked.

Many changes and modifications could be made to the invention without departing from the spirit thereof. The scope of these changes will become apparent from the appended claims.

The invention claimed is:

1. An electrical generator with an alternator configured to supply power to an electrical load via at least one hot lead, a neutral lead and a ground lead, wherein a frame of the electrical generator is isolated from an earth ground, the electrical generator comprising:
a first receptacle electrically connected to at least one of the hot leads, the neutral lead, and the ground lead, wherein:
the neutral lead and the ground lead are not electrically connected on the electrical generator,
the first receptacle does not include a ground fault circuit interrupter (GFCI),
the first receptacle is adapted to interface with a first power cord designed to be interconnected with an electrical system of a building, and
the neutral lead and the ground lead are bonded at a panel within the building and power is supplied to the electrical load via the first power cord and the electrical system of the building;
a second receptacle having no GFCI protection and electrically connected to at least one of the hot leads, the neutral lead, and the ground lead, wherein the neutral lead is isolated from the ground lead and wherein the second electrical receptacle is adapted to interface with a second power cord connected directly to the electrical load; and
a lockout arrangement that prevents simultaneous supply of power from both the first receptacle and the second receptacle.

2. The generator of claim 1 wherein the first receptacle is a multipole locking receptacle and the second receptacle is a duplex receptacle.

3. The generator of claim 1 wherein the lockout arrangement includes a pushbutton that when depressed prevents the flow of electrical current to the second receptacle.

4. The generator of claim 3 wherein the pushbutton is mounted to the first receptacle such that the pushbutton is automatically depressed when a plug of the first power cord is plugged into the first receptacle.

5. The generator of claim 4 wherein the lockout arrangement electrically isolates the second receptacle when a plug of the first power cord is plugged into the first receptacle.

6. The generator of claim 1 wherein the lockout arrangement includes a lockout member movably mounted to the generator and movable between a first position in which the first receptacle is exposed and the second receptacle is covered and a second position in which the first receptacle is covered and the second receptacle is exposed.

7. The generator of claim 6 wherein the lockout arrangement includes a pin generally adjacent the first receptacle and the second receptacle, and wherein the lockout member comprises a plate slidably mounted to the pin and reciprocally movable about the pin between a first position and a second position, wherein the plate exposes the first receptacle and prevents access to the second receptacle when in the first position and exposes the second receptacle and prevents access to the first receptacle when in the second position.

8. The generator of claim 1, including neutral connections that provide either a bonded neutral arrangement or a floating neutral arrangement, and a switch operable in concert with the neutral connections and the lockout arrangement for switching the electrical generator to be operable in either the bonded neutral arrangement or the floating neutral arrangement.

9. The generator of claim 8 wherein the first receptacle is capable of providing electrical power to a first electrical device when the switch is in a first, bonded neutral position and the second receptacle is capable of providing electrical power to a building electrical system when the switch is in a second, floating neutral position.

10. An electrical generator comprising:
a frame isolated from an earth ground;
an alternator mounted on the frame including an output configured to supply power to an electrical load via at least one hot lead, a neutral lead, and a ground lead, wherein the neutral lead and the ground lead are not electrically connected on the electrical generator;
a first electrical socket operatively connected to the output of the alternator and operative to engage a first power cord configured to be connected to an electrical system of a building, wherein the neutral lead and the ground lead are bonded at a panel of the electrical system of the building and wherein the first electrical socket has no ground fault circuit interrupter (GFCI);
a second electrical socket operatively connected to the output of the alternator and operative to engage a second power cord, wherein the second electrical socket has no GFCI; and
means for disabling one of the first electrical socket and the second electrical socket when the other one of the first electrical socket and the second electrical socket is in use.

11. The electrical generator of claim 10 wherein the disabling means includes a lockout member positioned adjacent the first electrical socket and the second electrical socket, wherein the lockout member is movable between a first position in which the second electrical socket is exposed and a second position in which the first electrical socket is exposed.

12. The electrical generator of claim 10 wherein the disabling means includes an actuator extending outwardly from the first electrical socket, and configured to be depressed when the first power supply member is engaged with the first electrical socket, and further comprising a switch arrangement operably coupled to the actuator that electrically isolates the second electrical socket when the actuator is depressed.

13. The electrical generator of claim 10 wherein the disabling means includes a three-pole switch for selectively connecting one of the first electrical socket and the second electrical socket to a current source associated with the generator.

14. A floating neutral electrical generator, comprising:
a frame isolated from an earth ground;
an alternator mounted on the frame including an output configured to supply power to an electrical load via at least one hot lead, a neutral lead, and a ground lead;
a first floating neutral socket operatively connected to the output of the alternator and mounted to the generator, wherein the first floating neutral socket has no ground fault circuit interrupter (GFCI);
at least one second floating neutral socket operatively connected to the output of the alternator and mounted to the generator proximate to the first floating neutral socket, wherein the second floating neutral socket has no GFCI; and
a lockout device configured to selectively provide access to one of the first floating neutral socket and the second floating neutral socket.

15. The generator of claim 14 further comprising a power cord configured to connect the first floating neutral socket to a building electrical system and to bond the neutral lead and the ground lead at a panel of the building electrical system.

* * * * *